United States Patent Office 3,086,199
Patented Apr. 16, 1963

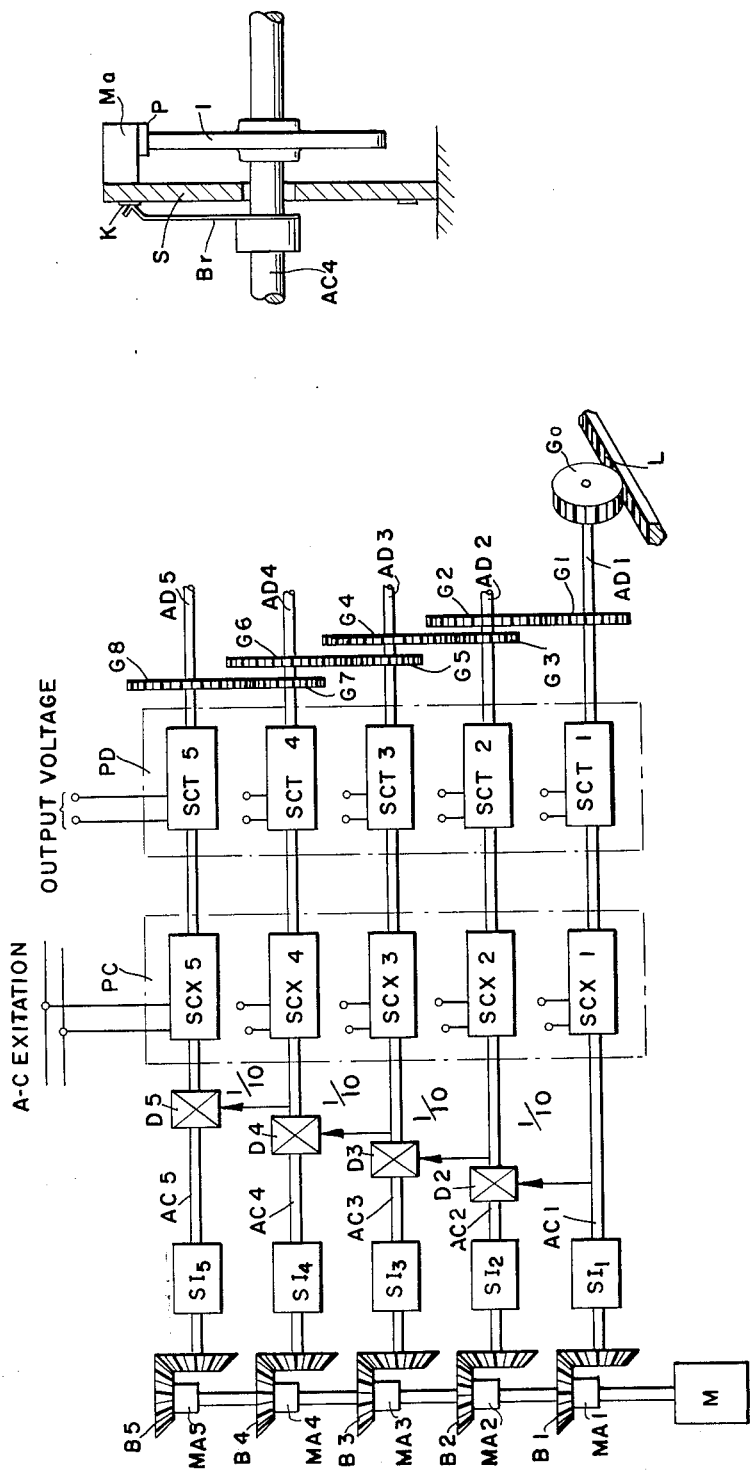

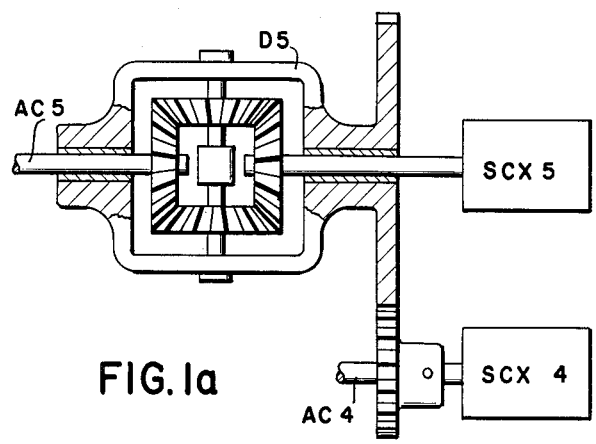
FIG.1a
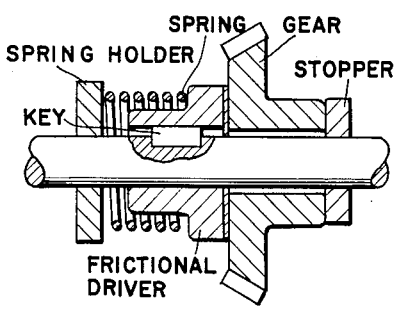
FIG.1c
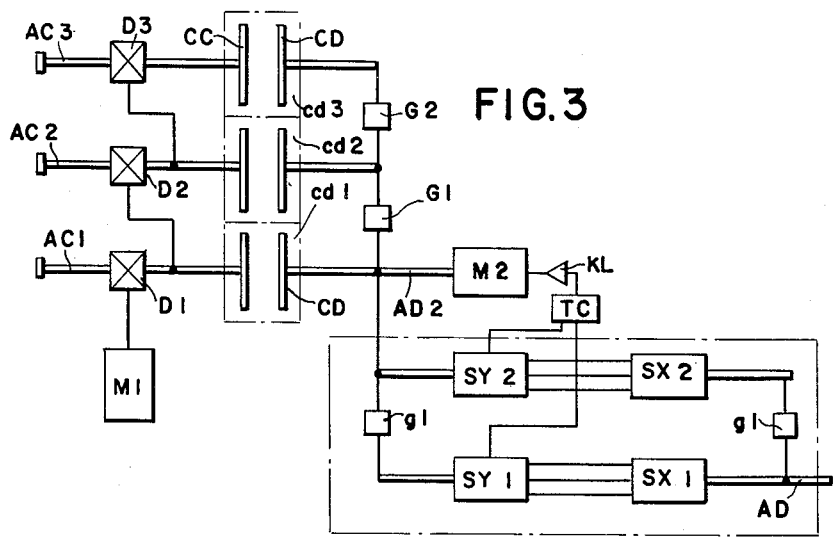
FIG.3
FIG.4
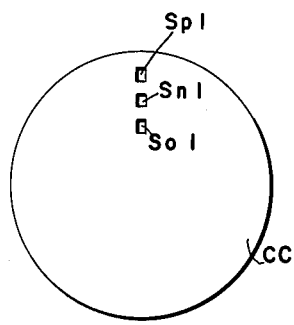
FIG.5
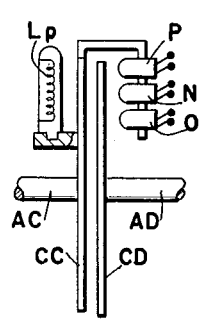
FIG.6
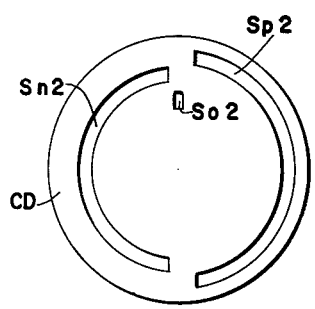

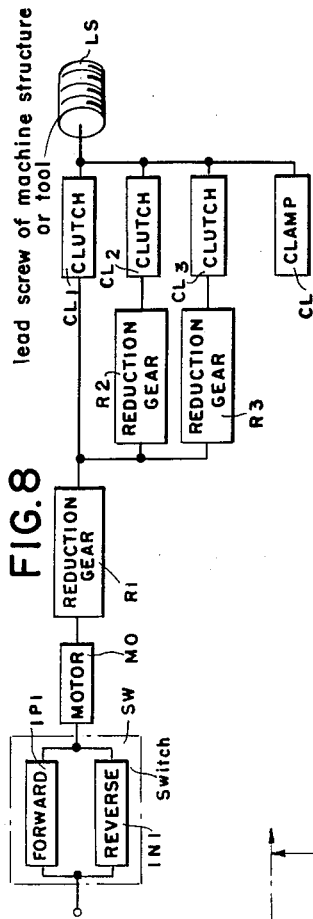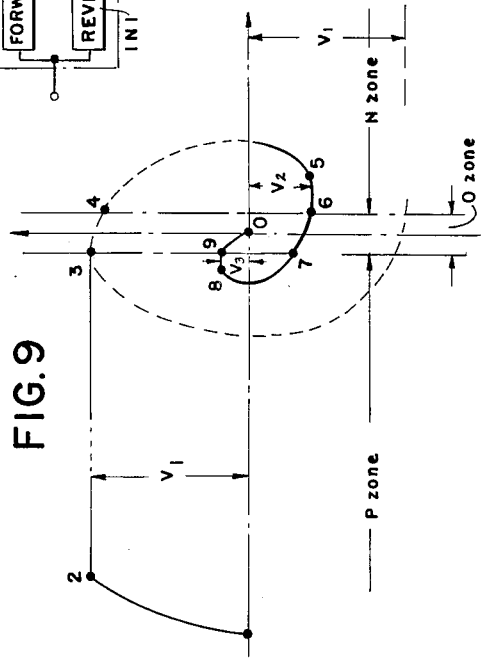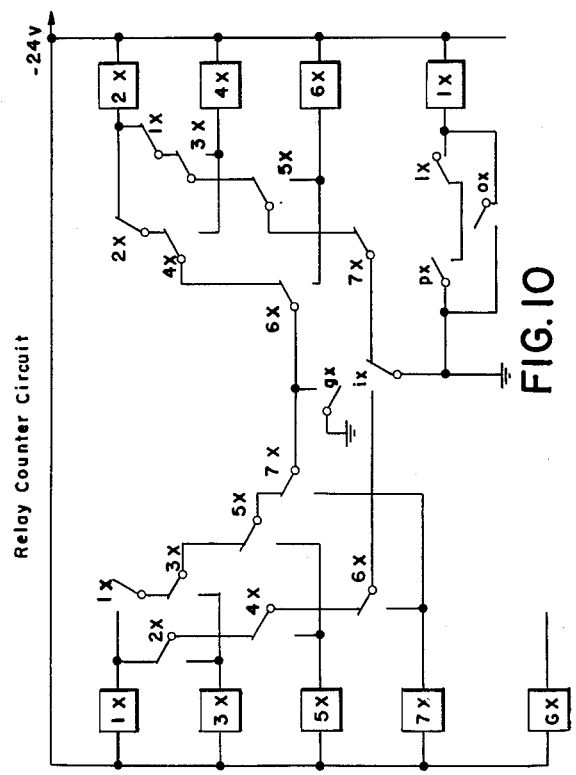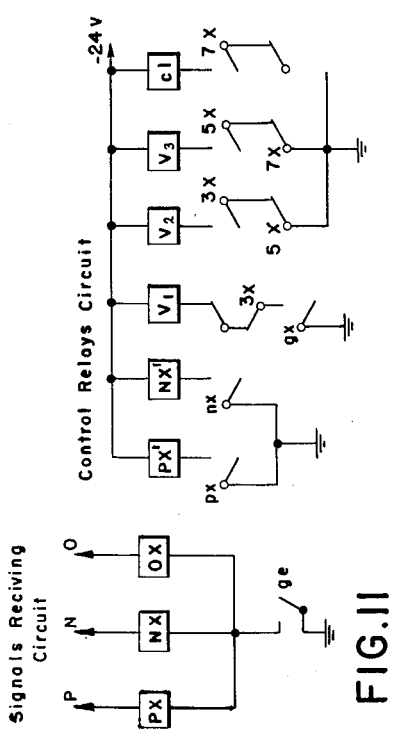

3,086,199
NUMERICAL POSITION CONTROL SYSTEM
Kanryo Shimizu, Hajime Mori, and Takayoshi Koga, Kawasaki-shi, Japan, assignors to Fuji Tsushinki Seizo Kabushiki Kaisha, Kawasaki, Japan, a corporation of Japan
Filed Dec. 29, 1960, Ser. No. 79,429
4 Claims. (Cl. 340—347)

Our invention relates to automatic location or position control systems operating in response to numerical instructions. Such numerical control systems are used for the automatic control of machine tools and other fabricating or processing machinery. The invention has particular reference to position control systems using photoelectric position detecting and control means.

The invention will be described with reference to the accompanying drawings in which:

FIG. 1 is a schematic diagram of a known control system of the general type with which our invention is concerned;

FIG. 1a shows, partly in section, a component portion of the same system;

FIG. 1b is a sectional elevation of a data switch used in FIG. 1, and

FIG. 1c is an exemplary showing of a slip clutch as used in FIG. 1.

FIGS. 2 and 3 are schematic diagrams of two embodiments of control systems according to the invention.

Figure 2:
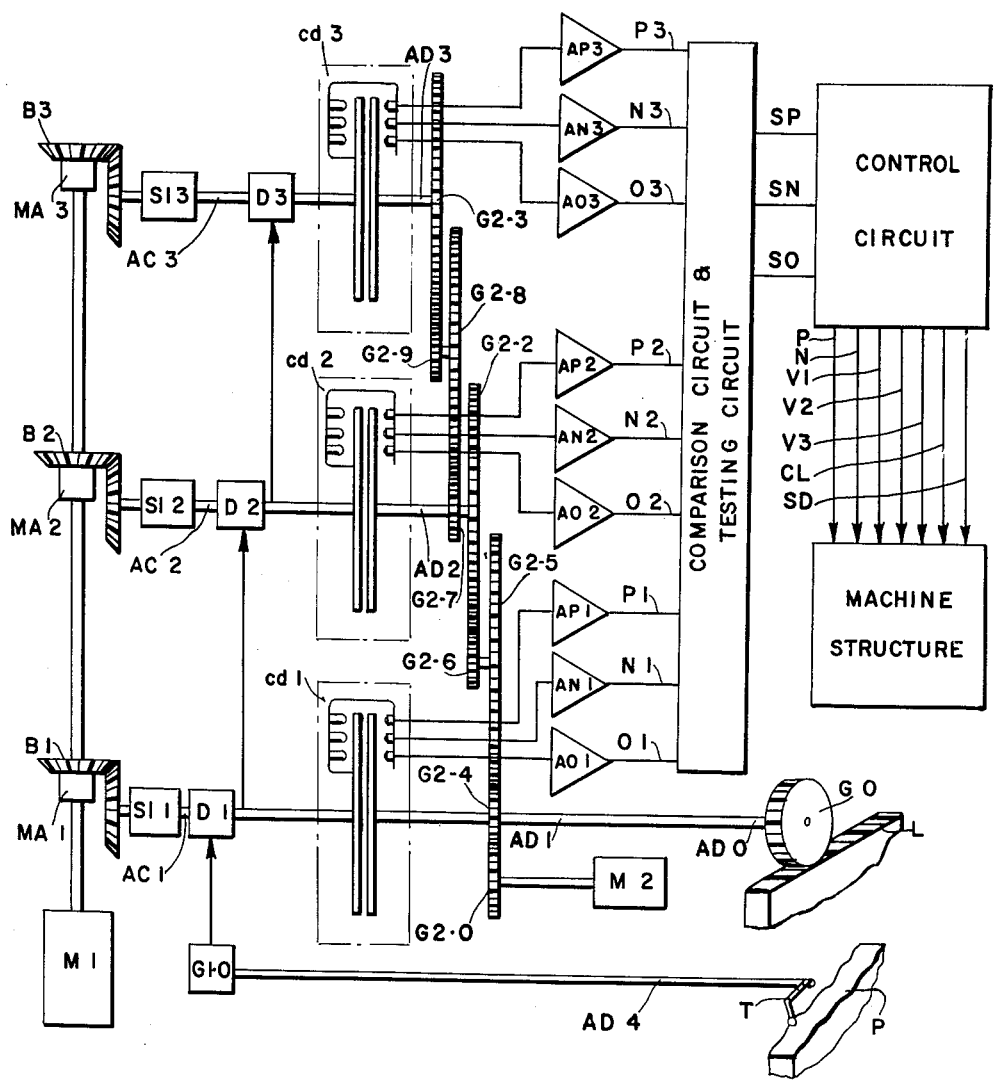

FIGS. 4 5 and 6 are a front view, side view and rear view respectively of one of several photoelectric devices which form part of the systems shown in FIGS. 2 and 3.

Figure 7:
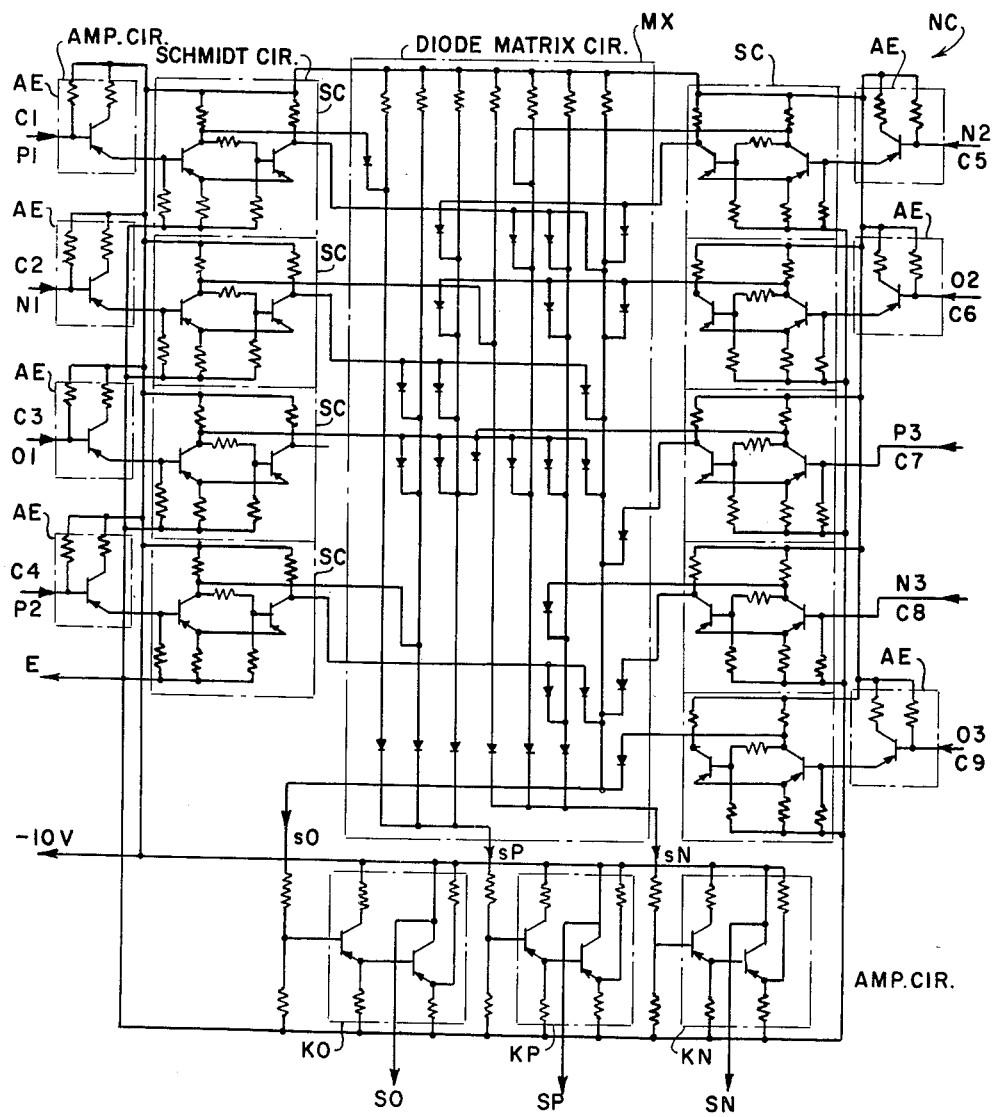

FIG. 7 illustrates schematically the comparison circuit and checking circuit of FIG. 2.

FIG. 8 shows by way of a block diagram part of the control circuit in FIG. 2.

FIG. 9 is illustrating the movement of the machine structure, in response to the control circuit of FIG. 2.

FIGS. 10, 11, and 12 show wiring diagrams of the relay circuits which control the engagement of the clutches in FIG. 8.

Figure 13:
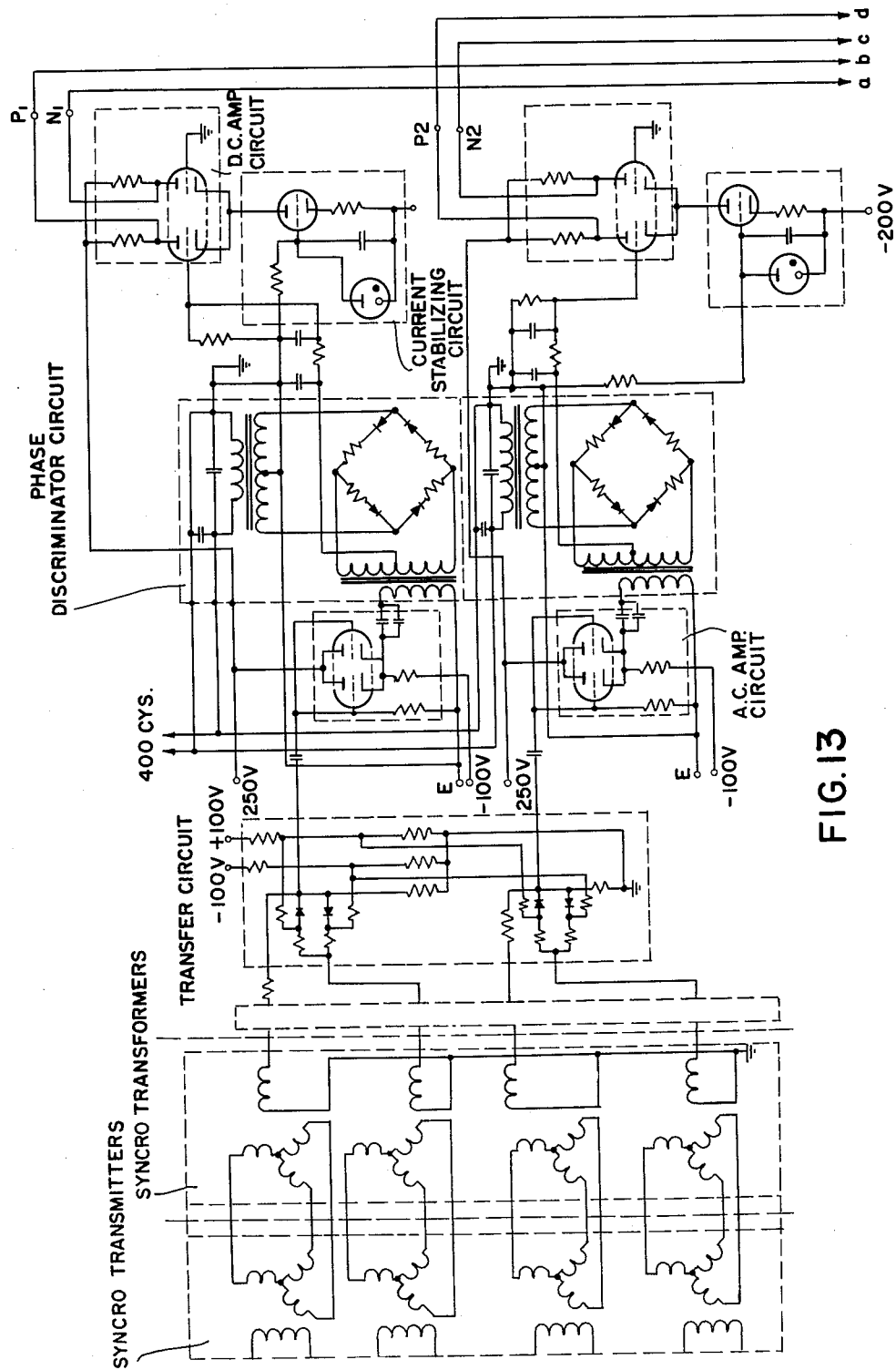
Figure 14:
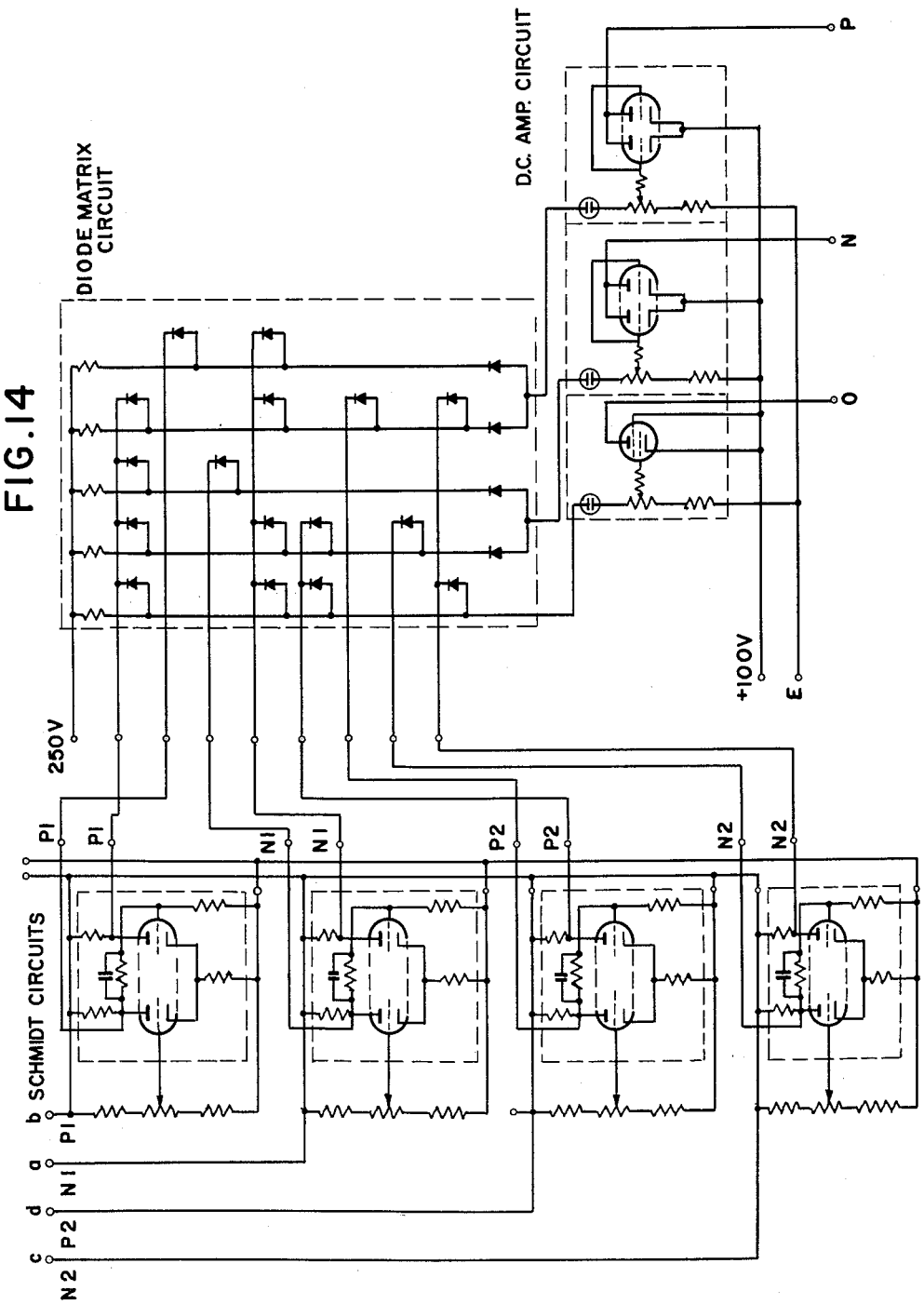

FIGS. 13 and 14 are circuit diagrams of a control system appertaining to the system shown in FIG. 1.

It is the general object of our invention to improve numerical position control systems of the known type exemplified in FIGS. 1 and 1a, wherein a number of synchro-transmitters and synchro transformers are employed for issuing a position-responsive control voltage.

The illustrated system comprises a location instructing (data-input) assembly PC, and a position detecting assembly PD. The instructing assembly PC is shown equipped with five synchro control transmitters SCX1 to SCX5 to which numerical instructions are given by a motor M through slip clutches MA1 to MA5, bevel gears B1 to B5, data input switches $SI_1$ to $SI_5$, data input shafts AC1 to AC5, and differential gears D1 to D5. Of the above, the gear D5 is separately illustrated in FIG. 1a, the data input switch $SI_4$ is separately illustrated in FIG. 1b as an example of the construction of all the switches $SI_1$ to $SI_5$, and the slip clutch MA4 is separately illustrated in FIG. 1c. The detecting assembly PD comprises five synchro control transformers SCT1 to SCT5, which are coupled with each other and with a primary detecting shaft AD1 through reduction gears G1 to G8.

Numerical instructions are entered into the system through the data input switches SI to the synchro transmitters SCX1 to SCX5, whereas the position of the controlled machine structure is detected by a rack L meshing with pinion Go, and is conveyed to the synchro transformers SCT1 to SCT5. The resultant difference in output voltage produced between the transmitters and the synchro transformers and available at each transformer is used for controlling the position of the machine structure in the sense required to eliminate the difference. Relative to the positioning drive and appertaining controls to be operated in accordance with the voltage output of the illustrated control system, any control means known for such purposes can be used and the particular means thus employed are not essential to the present invention proper.

Referring to FIG. 1b, a numerical value is imposed upon the shaft AC4 as follows. A voltage supply (not shown) is connected to the one of a plurality of mutually insulated conducting segments K corresponding to the desired numerical value on a stationary selecting plate S of the switch SI4. To utilize this value, the above-mentioned motor M rotates the shaft AC4 by way of the friction clutch MA4 and the gear B4. An armature brush $Br$, keyed upon the shaft AC4 to rotate therewith, contacts the segment K to energize an electromagnet $Ma$. An indexing pin P, actuated by the magnet $Ma$, positively engages an indexing plate I keyed to the shaft AC4 and stops the motion of the shaft AC4 to secure it in one position. The desired numerical "instruction" value is thus changed into the angular position of the shaft AC4. The switches $SI_1$ to $SI_3$, and $SI_5$ similarly impose angular positions corresponding to the desired numerical values upon the shafts AC1, AC2, AC3, AC5.

Each two sequential data input shafts AC1 to AC5 are coupled with each other by one of the differential gears D1 to D5 at a reduction gear ratio of 1:10, so as to add to the rotation of each higher order shaft one tenth of the rotation of the next lower order of magnitude.

To enter a numerical value of five digits such as $$n = n_5 10^4 + n_4 10^3 + n_3 10^2 + n_2 10 + n_1$$

into the unit PC, the values $n_1$, $n_2$, $n_3$, $n_4$, $n_5$ should be entered into the shafts AC1, AC2, AC3, AC4, and AC5, respectively. This is done when the five shafts are simultaneously rotated by motor M through clutches MA1, MA2, MA3, MA4, MA5 and gears B1 to B5. The movement of each shaft is then separately restricted by the switches $SI_1$ to $SI_5$ after having rotated through angles corresponding to the input digits.

Although as stated, any known positioning drive may utilize the voltages of the synchro transformer SCT1 to SCT5 for the purpose of moving the structure to be controlled, FIGS. 13 and 14 show an example of a positioning drive which is connected to a control system identical with the one illustrated in FIG. 1, except that this control system has four synchro transformers instead of the five shown in FIG. 1.

In FIG. 13, the outputs of 4 synchro transformers are gathered in two outputs in the transfer circuit. The outputs are then converted to direct current signals in the Phase Discriminator Circuit and further converted to three signals P, N and O by means of the Voltage Comparison Circuit and the Diode Matrix in FIG. 14. Details of the Phase Discriminator Circuit of FIG. 13 may be found in the Control Engineers Handbook, compiled by John G. Truxal, first edition, 1958, on pages 6–63, FIG. 6.72, Ring Modulator and the explanation thereof. The three before-mentioned signals are used by the control to locate the machine structure in a known manner.

As stated, each two sequential data input shafts AC1 to AC5 are coupled with each other by one of the differential gears D1 to D5 at a reduction gear ratio of 1:10. The detecting or pilot shafts AD1 to AD5 are analogously coupled with each other by gears G1 to G8 at the same reduction ratio of 1:10. By combining the five synchro transmitters and the corresponding synchro transformers in this manner, a high precision of digital position control is obtainable.

As is apparent from the illustration, a location control system of this type requires many sets of synchro units to obtain the desired precision of control. This renders such systems extremely expensive and involves the use of complicated auxiliary electric circuits, such as phase discriminating circuits and signal transmitting circuits.

It is therefore a more specific object of our invention to greatly minimize these requirements, thus providing a control system of improved overall simplicity, a reduced number of components, reduced space requirements, and lower cost.

To this end, and in accordance with a feature of our invention, we provide the control system with a number of photoelectric devices, one for each pair of data-input and position-detecting pilot shafts. Each of these photoelectric devices comprises two selector discs mounted on the two respective shafts of each pair just mentioned. Thus, one disc provides location instruction and the other provides position detection. A photoelectric sensing member is used for response to the relative angular departure of the position-detection disc from the position-instruction disc, thereby providing an output voltage of the proper polarity for controlling the machine structure to be shifted to the instructed position at the desired high precision.

The foregoing and other objects, advantages and features of our invention, said features being set forth with particularity in the claims annexed hereto, will be apparent from the following description of the embodiments illustrated by way of example in FIGS. 2 through 8 of the accompanying drawings.

FIG. 2 is a simplified block diagram of a system according to the invention which is similar to the system more fully described above with reference to FIG. 1, except that the groups of synchro transmitters SCX1 to SCX5 and synchro transformers SCT1 to SCT5 are substituted by a group of photoelectric devices Cd1 to Cd3. While the system of FIG. 2 is shown for three-digit numerical information, it should be understood that any desired greater number of digits, for example five digits, may be involved, in analogy to FIG. 1.

Each of the three photoelectric devices Cd1 to Cd3 is provided with two coaxial discs CC and CD (FIGS. 2, 4, 5, 6). Location instructions are given to the discs CC by means of the instructing shaft AC1 to AC3 and differential gears D1 to D3 in the same manner as explained above with reference to FIG. 1. The position of the machine structure to be controlled is detected by a rack L and a pinion Go, acting through a detecting shaft AD and reduction gears G1 and G2 on the respective discs CD of the photoelectric devices Cd1 to Cd3. The three photoelectric devices produce an electric output voltage of negative or positive polarity depending upon the amount and direction of departure of the disc Cd from the position of the instruction disc CC, this voltage being reduced to zero when the positions of the respective discs coincide with each other. The electric output voltage serves for high-precision control of the machine structure to be controlled.

The above-mentioned photoelectric devices are separately illustrated in FIGS. 4, 5 and 6. As mentioned above, the location instructing disc CC of each device is directly connected or coupled with the location instructing shaft AC. The position detecting disc CD is connected or otherwise coupled with the position detecting shaft AD. Each photoelectric device further comprises a photoelectric sensing unit composed of a lamp Lp mounted on disc CC, and three photoelectric elements P, N and O, preferably consisting of phototransistors. The location instructing disc CC has three holes $Sp1$, $Sn1$ and $So1$ which face the photoelectric elements P, N and O respectively. The position detecting disc CD has two arcuate slits $Sp2$, $Sn2$ and a hole $So2$. The slits $Sp2$ and $Sn2$ are so arranged that they do not overlap each other.

Depending upon the relative angular position of the discs CC and CD, one of the three photoelectric elements P, N and O produces an output voltage of the proper polarity. When the discs CC and CD are so positioned relative to each other that the two holes $So1$ and $So2$ register with each other, the output voltage of the photoelectric element O is zero. However, when the discs are so positioned that the hole $Sp1$ is located on the slit $Sp2$, the element P produces a positive output voltage. Analogously, when the hole $Sn1$ is located opposite the slit $Sn2$, the element N produces a negative output voltage. The zero output of the element O is indicative of the fact that the angular deviation between the discs CD and CC is zero.

For the purpose of a position controlling operation, the location instructing disc CC is to be pre-set to a desired angular position, and the position of the detecting disc CD is so controlled that it stops in a position corresponding to that of the machine structure being controlled. In this manner, it is possible to precisely control the location of the machine structure by means of the output voltages from the photoelectric elements P, N and O. The output voltage of the element O may then serve for definitely stopping the displacing motion of the position-controlled machine structure.

The motor M2, a torque motor, takes up any backlash in the gearing of rack L and pinion Go. This is accomplished by continuous application of a torque in a given direction.

The electric output voltages from the photoelectric elements precisely control the machine structure to be controlled by means including separate amplifiers AO1, AP1, AN1; AO2, AP2, AN2; AO3, AP3, AN3 which respectively connect the elements P, N and O of photoelectric devices Cd1, Cd2, Cd3 to a network NC composed of a comparison circuit and a checking circuit.

FIG. 7 schematically illustrates the network NC. Because the latter is not essential to the invention and known networks may be substituted therefor it is described only generally as is necessary for a clear understanding of the invention. Additional explanation may be obtained therefor in the "Control Engineers Handbook," edited by Truxal, first edition, p. 6–75, FIG. 6.91 and the text pertaining thereto. Seven emitter-follower connected amplifiers AE transmit all but two of the input signals of the network NC to seven corresponding so-called "Schmidt circuit" triggers designated SC; the other two input signals from amplifiers AP3 and AN3 being connected directly to corresponding Schmidt circuit triggers. A diode matrix circuit MX including a combination of "and" circuits and "or" circuits then converts the nine signals to three signals $sP$, $sN$, $sO$, which are in turn electrically enhanced by three amplifiers KP, KN and KO to form three output signals designated SP, SN, SO.

A control circuit designated CS utilizes the signal SP, SN and SO to direct the motion of the machine structure to be controlled, carrying the rack L; the latter serving to detect, in conjunction with the pinion Go, the position of the machine tool.

FIG. 8 generally illustrates, by way of a block diagram, the construction and operation of the control circuit. A switch Sw, having forward and reverse motor-switching member 1P1 and 1N1, operating in dependence upon the signal applied thereto, energizes a motor MO for forward or reverse movement, or stops the motor. A reduction gear R1 couples the shaft of motor MO to the lead screw LS, or the like, of the machine structure to be controlled by way of a disengageable clutch CL1, by way of reduction gear R2 and disengageable clutch CL2, or by way of a very high-ratio reduction gear R3 and clutch CL3. A sequential switching system shown in FIG. 10 determines which clutch (CL1, CL2 or CL3) is engaged at any time, and operates so that when a positive position signal is first applied to the motor MO as a result of the machine structure being offset in one direction from the desired input signal the clutch CL1 is engaged and the rotational velocity applied to the lead screw LS has the greatest value. When the machine structure, as a result of this high initial velocity, inertially overshoots its zero position, a zero signal first occurs and the clutch CL1 is disengaged. The overshoot then applies a negative signal to the motor and reversal of motor direction occurs. The switching system, in response to this zero signal and reversal, serves to engage clutch CL2 so that the reverse rotational velocity applied to lead screw LS has an intermediate magnitude. Another reversal results in disengagement of clutch CL2 and engagement of clutch CL3 for a still slower rotation of the lead screw LS. The reduction of speed by gear R3 is sufficient to prevent the machine structure from passing over the desired position and a clamp CL serves to stop the lead screw SL. The sequential switching system is illustrated in FIG. 10.

FIG. 9 illustrates the movement of the machine structure to be controlled when the circuit of FIG. 8 moves that structure from the position 1 to the position 0. The structure is first detected, by a P signal, resulting from the position of rack L, at position 1 in the P zone of FIG. 9. The switch 1P1 is thus closed by the P signal so that the motor MO is driven by way of the clutch CL1 in the forward direction to move the lead screw LS at speed $V_1$. When the structure to be controlled is driven by the motor MO and arrives at position 3, the P signal is eliminated and an O signal is detected to open switch number 1P1 and disengage clutch $CL_1$. When the inertia of the structure carries it past the desired position 0 to position 4, the switch 1N1 is closed so that the motor MO is driven in the reverse direction, the latter rotating the lead screw LS, by way of clutch $CL_2$, in the reverse direction at a speed $V_2$ somewhat slower than $V_1$. Similarly, movement of the structure to position 6 effects turning of the lead screw LS in the forward direction, by way of clutch $CL_3$, at a still lower speed $V_3$. Movement of the structure to be controlled to position 9 stops the motor MO and clamp CL serves to stop the rotation of the lead screw LS.

The above-described operation is particularly relevant for the case when the structure to be controlled is in the P zone. When the structure is in the N zone, the speed $V_1$ is not changed as a result of the first O signal. Only the driving direction is then reversed as a result of the first O signal. Further movement of the structure occurs as described above.

Thus location of the structure is accomplished with great precision as the lead screw LS allows the structure to make repeated passes at the desired position at stepwise decreasing speeds.

FIG. 10 is an example of the Relay Counter Circuit which selectively engages and disengages the clutches $CL_1$, $CL_2$, $CL_3$ and the clamp CL. A Signal Receiving Circuit and a Control Relay Circuit associated with the Relay Counter Circuit are shown in FIGS. 11 and 12 respectively. FIGS. 10, 11 and 12 are interconnected in that a plurality of relay coils having a prefix letter or number and an upper-case suffix letter; namely coils IX, GX and 0X to 7X; magnetically control the corresponding switch members in all of these figures having the corresponding lower-case prefix letter or number and the corresponding lower-case suffix letter; namely switch members *ix*, *gx*, and *0x* to *7x* respectively.

The relay GX in FIG. 10 begins to operate after the confirmation of the end of the settling of the digital instruction in order to prepare the operation of the circuit in FIGS. 10, 11 and 12. The relay IX operates upon each O signal so as to operate the Counter Circuit.

Summarily, the instruction discs CC of the photo-electric devices are rotated in accordance with the entered numerical instruction, and the subsequent rotation of the discs DC has the effect of supplying the desired position control to the machine structure to be set in accordance with the numerical instructions, as explained above.

A lever T on an auxiliary detecting shaft AD4 shown in FIG. 2 is coupled with shaft AC1 through a gear G1-0 and the differential gear D1 for the purpose of correcting pitch errors of the rack L with the aid of a cam plate P.

The control system shown by another block diagram in FIG. 3 differs from that of FIG. 2 in being provided with two synchro control transmitters SX1 and SX2, two synchro control transformers SY1 and SY2, a servo motor M1 for driving the instruction shafts AC1 to AC3, and another servo motor M2 for driving the detecting shaft AD2. The electrical outputs from the photoelectric cells are omitted in FIG. 3 for clarity. The position of the controlled machine structure is conveyed to the detecting shaft AD2 through the medium of the synchro transmitters SX1 and SX2, the synchro transformers SY1 and SY2, a synchro signal transfer circuit TC (such as to the one shown in FIG. 13), and A.C. amplifier KL, and the servo motor M2. Accordingly, the respective discs CD of the photoelectric devices $Cd1$ and $Cd3$ are not directly connected with the position detecting shaft AD by constrained mechanical transmissions so that it is not necessary to mount the components of the control system proper, including the photoelectric devices $Cd1$ to $Cd3$, directly on or near the machine being controlled.

It will be understood by those skilled in the art, upon a study of this disclosure, that our invention permits of various modifications with respect to structural components and circuitry, and may be given embodiments other than particularly illustrated and described herein, without departing from the essential features of our invention and within the scope of the claims annexed hereto.

We claim:

1. A numerical control system for controlling the position of a structure, comprising a number of control shafts coupled with each other at a fixed transmission ratio so as to be digitally related to each other; position detecting means movable in accordance with positional change of the structure to be controlled, a number of detector shafts coupled with said detecting means and coupled with each other at a fixed transmission ratio so as to be digitally related to each other; each of said control shafts being coaxially aligned with one of said respective detector shafts; a number of photoelectric devices each having two discs coaxially mounted on one of said respective control shafts and the one aligned detector shaft respectively, one of said discs having mounted thereon a light source positioned on one side of said other disc and three radially aligned photosensitive devices on the other side of said disc, said other disc defining three arcuate apertures at different respective radii and occupying mutually exclusive sectors, two of said arcs being substantially semicircular and the third being small relative to the other two, whereby said photosensitive devices issue a corrective output signal when the instantaneous angular position of one disc departs from that of the other.

2. A numerical control system for controlling the position of a structure, comprising a main shaft, a number of digitally intercoupled control shafts coupled with said main shaft to be angularly displaced in accordance with respective digital values of the main-shaft angular displacement; a position detecting member movable in accordance with positional change of the structure to be controlled, a number of pilot shafts digitally intercoupled and operatively connected with said detecting member to be angularly displaced in accordance with respective digital values of the detector-member displacement, each of said respective pilot shafts forming a pair together with the one digitally corresponding control shaft; a number of photoelectric devices each having two discs coaxially mounted on one of said respective control shafts and the corresponding one pilot shaft respectively, one of said discs having mounted thereon a light source positioned on one side of said other disc and three radially aligned photosensitive devices on the other side of said disc, said other disc defining three arcuate apertures at different respective radii and occupying mutually exclusive sectors, two of said arcs being substantially semicircular and the third being small relative to the other two, whereby said photosensitive devices issue a corrective output signal when the instantaneous angular position of one disc departs from that of the other.

3. A numerical control system for controlling the position of a structure, comprising a number of control shafts coupled with each other at a fixed transmission ratio so as to be digitally related to each other, position detecting means movable in accordance with positional change of the structure to be controlled, a number of detector shafts coupled with said detecting means and coupled with each other at a fixed transmission ratio so as to be digitally related to each other, each of said control shafts being coaxially aligned with one of said respective detector shafts, a pair of discs coaxially mounted on one of said respective control shafts and the corresponding one of said pilot shafts, a light source secured to one disc in each pair and positioned on one side of the other disc, three radially aligned photoelectric sensing means secured to the same one disc in each pair and positioned on the other side of the other disc, said other disc having three arcuate windows of different radii occupying different sectors, two of said windows being substantially equal to each other in arc length but greater than the third window, whereby said sensing means issue a corrective output signal when the instantaneous angular position of one disc departs from that of the other.

4. A numerical control system for controlling the position of a structure, comprising a number of control shafts coupled with each other at a fixed transmission ratio so as to be digitally related to each other, position detecting means movable in accordance with positional change of the structure to be controlled, a number of detector shafts coupled with said detecting means and coupled with each other at a fixed transmission ratio so as to be digitally related to each other, each of said control shafts being coaxially aligned with one of said respective detector shafts, a pair of discs coaxially mounted on one of said respective control shafts and the corresponding one pilot shaft respectively, a light source secured to one disc in each pair and positioned on one side of each pair of discs, said light source being elongated and extending radially relative to the respective shafts, three radially aligned photoelectric sensors secured to the same one disc in each group and positioned on the other side of each pair of discs, one of said discs in each pair having three radially aligned windows, the other of said discs having three openings radially spaced a distance corresponding to each of said windows, one of said openings corresponding in size to one of said windows and being adapted to face one of said windows, the others of said openings extending arcuately from the respective angular ends of said first opening, whereby one of said sensors issues a signal when the first opening and one of said windows face each other and the other sensors issue respective signals when the instantaneous angular position of one disc departs from that of the other in one or the other direction.

References Cited in the file of this patent

UNITED STATES PATENTS

| | | |
|---|---|---|
| 1,931,852 | Reichel et al. | Oct. 24, 1933 |
| 2,440,083 | Gley | Apr. 20, 1948 |
| 2,560,337 | Fouassin | July 10, 1951 |
| 2,710,934 | Senn | June 14, 1955 |
| 2,764,720 | Kelling | Sept. 25, 1956 |
| 2,823,344 | Ragland | Feb. 11, 1958 |
| 2,924,768 | Farrand et al. | Feb. 9, 1960 |
| 2,943,251 | Hull | June 28, 1960 |
| 2,945,167 | Gunther | July 12, 1960 |
| 2,987,661 | Sweitz | June 6, 1961 |
| 3,020,460 | Morin et al. | Feb. 6, 1962 |